US008662021B2

(12) United States Patent
Gustafsson

(10) Patent No.: US 8,662,021 B2
(45) Date of Patent: Mar. 4, 2014

(54) DETECTING METHOD AND ARRANGEMENT FOR DAIRY CATTLE

(75) Inventor: Mats Gustafsson, Oviken (SE)

(73) Assignee: DeLaval Holding AB, Tumba (SE)

( * ) Notice: Subject to any disclaimer, the term of this patent is extended or adjusted under 35 U.S.C. 154(b) by 1687 days.

(21) Appl. No.: 11/918,941

(22) PCT Filed: Apr. 25, 2006

(86) PCT No.: PCT/SE2006/000477
§ 371 (c)(1),
(2), (4) Date: Apr. 17, 2008

(87) PCT Pub. No.: WO2006/118508
PCT Pub. Date: Nov. 9, 2006

(65) Prior Publication Data
US 2009/0056637 A1    Mar. 5, 2009

(30) Foreign Application Priority Data
Apr. 29, 2005    (SE) .......................................... 050094

(51) Int. Cl.
*A01K 29/00*    (2006.01)
(52) U.S. Cl.
USPC ........................................ 119/712; 340/573.3
(58) Field of Classification Search
USPC ............... 119/712, 719, 174, 908; 340/573.3, 340/429, 573.4, 689, 573.1; 200/61.52
See application file for complete search history.

(56) References Cited

U.S. PATENT DOCUMENTS

| | | | |
|---|---|---|---|
| 1,915,267 | A | 6/1933 | Bigelow |
| 4,618,861 | A | 10/1986 | Gettens et al. |
| 4,884,067 | A | 11/1989 | Nordholm et al. |
| 5,006,676 | A | 4/1991 | Bogut et al. |
| 5,010,893 | A | 4/1991 | Sholder |
| 5,183,056 | A | 2/1993 | Dalen et al. |
| 5,880,659 | A | 3/1999 | Woods |
| 6,049,280 | A | 4/2000 | Andersson |
| 6,104,294 | A | 8/2000 | Andersson et al. |

FOREIGN PATENT DOCUMENTS

| | | |
|---|---|---|
| EP | 0705536 | 4/1996 |
| EP | 0903980 | 3/1999 |
| EP | 0959672 | 12/1999 |
| EP | 0 743 043 | 9/2003 |
| EP | 0743043 | 9/2003 |
| JP | 03-140874 | 6/1991 |
| JP | 06-141385 | 5/1994 |
| JP | 2003-189751 | 7/2003 |
| JP | 2004-337093 | 12/2004 |
| JP | 2006-075090 | 3/2006 |
| WO | WO 00/33028 | 8/2000 |

OTHER PUBLICATIONS

Search Report dated Jul. 6, 2010 issued in corresponding European Application No. 06733333.

*Primary Examiner* — T. Nguyen
(74) *Attorney, Agent, or Firm* — Young & Thompson

(57) ABSTRACT

A detecting method for dairy cattle comprises the steps of: automatically measuring lying and standing times for a milking animal by a sensor; automatically comparing the measured lying and standing times for said milking animal with reference values of lying and standing times; and automatically establishing whether said milking animal is in heat or not based on said comparison. The automatic sensor may also be used for measuring a health parameter of the milking animal.

8 Claims, 3 Drawing Sheets

DETECTING METHOD AND ARRANGEMENT FOR DAIRY CATTLE

TECHNICAL FIELD OF THE INVENTION

The present invention relates generally to dairy farming, and more specifically to detecting methods and arrangements for dairy cattle.

DESCRIPTION OF RELATED ART

In milk production today there are systems available that measures cow activity, i.e. motion, e.g. in order to find the estrus periods of the cows. Different aspects on activity measuring systems have been patented, see e.g. U.S. Pat. No. 5,183,056, U.S. Pat. No. 6,049,280, EP0743043 B1, EP0959672 B1, and EP0903980 B1.

SUMMARY OF THE INVENTION

However, activity measuring systems can in general not detect if a cow is standing or lying and this may in many instances be a drawback.

Particularly, in stalls with tied cows the activity measuring system is not satisfying since the cow is not capable of moving around, i.e. walking. For such tied dairy cattle it is very difficult, if at all possible, to find the estrus periods of the dairy cattle.

Further, the activity measuring systems may not be an optimum or even good choice for indicating illness, hoof problems, metabolic disorders such as ketosis and the like.

An object of the present invention is thus to provide a method and an arrangement, respectively, for automatically establishing whether a milking animal is in heat or not, which lack the above drawback.

This object is according to an aspect of the present invention attained by a method as claimed in claim 1 and an arrangement as claimed in claim 9.

By means of automatically measuring, by an uncomplicated sensor, lying and standing times for milking animals, particularly tied milking animals; automatically comparing the measured lying and standing times for the milking animals with reference values of lying and standing times; and automatically establishing whether the milking animals are in heat or not based on the comparisons, an accurate and reliable technique for automatically finding estrous animals in dairy cattle is obtained.

Typically, it is established that a milking animal is in heat if the sum of the measured standing times during a given time period exceeds a standing time reference value and/or if the number of measured standing times during a given time period exceeds a reference number value. The reference values can be found from historical lying and standing time data.

By such provisions the number of false establishments can be minimized. It has been verified that milking animals that are estrous are standing more frequently, and are shifting from standing to lying and vice versa more frequently.

In a preferred embodiment the sensor is attached to the milking animal, preferably to a leg thereof, and the measured lying and standing times are wirelessly transmitted to a processing device, preferably a heard management system, which controls various activities, such as milking and optionally feeding of the dairy cattle, wherein the above steps of automatically comparing and automatically establishing are performed by the processing device.

By such provisions the sensor may be made small and easily wearable by the milking animal, and processing can be made in an existing computer system.

A further object of the invention is to provide a method and an arrangement, respectively, for automatically indicating a health condition of a milking animal, which are based on measurements of lying and standing times for the milking animal.

This object is according to an aspect of the present invention attained by a method as claimed in claim 20 and an arrangement as claimed in claim 22.

By means of automatically measuring lying and standing times for milking animals by a sensor; automatically comparing the measured lying and standing times for the milking animals with reference values of lying and standing times; and automatically indicating health conditions of the milking animals based on the comparisons, an accurate and reliable technique for automatically finding ill animals, e.g. animals having hoof problems or metabolic disorders, is obtained.

Typically, it is established that a milking animal is ill if the sum of the measured standing times during a given time period is below a standing time reference value and/or if the number of measured standing times during a given time period is below a reference number value.

By such provisions the number of false establishments can be minimized. It has been verified that animals that are ill are standing less frequently, and are shifting from standing to lying and vice versa less frequently.

It is yet a further object of the invention to provide an arrangement for measuring lying and standing times for a milking animal, which is accurate, reliable, flexible, uncomplicated, of low cost, and easy to implement in existing herd management systems.

This object is according to an aspect of the present invention attained by an arrangement as claimed in claim 24.

The arrangement includes a sensor for measuring lying and standing times for a milking animal, which is attachable to the milking animal, preferably to a leg thereof, and comprises: a part, preferably a ball, movable between a first position and a second position; an electric circuit influenceable by the movable part; and means for measuring the influence of the electric circuit by the movable part and for detecting lying and standing times for the milking animal based on the measured influence of the electric circuit. The first position is reached when the milking animal is standing and the second position is reached when said milking animal is lying.

Preferably, the sensor comprises a hollow cone oriented so that the tip thereof is pointing downwards when the sensor is attached to a standing milking animal; the movable part is arranged within the hollow cone; the first and second positions are reached by means of the force of gravity acting on the movable part; and the movable part is located at the tip of the hollow cone in the first position and at the base of the hollow cone in the second position.

By such provisions an accurate, reliable, and uncomplicated moving mechanism is obtained. Since the cone is cylinder symmetric the sensor can be attached to any side of a leg of the animal as long as the tip of the cone points downwards, without hazarding the operation of the sensor. The moving part will move to the base of the cone when the sensor is turned to a horizontal position caused by the animal when she lies down independently of in which direction she puts her legs.

The angle of the cone has to be selected as a trade-off between a number of false indications that the animal is lying (when she actually is standing) and a number of false indications that the animal is standing (when she actually is lying).

The more acute-angled the cone is, the lower number of false lying indications is obtained, but to the cost of a higher number of false standing indications.

It shall be appreciated that the hollow cone can be exchanged for a bowl or the like.

The means for converting the movement by and/or the different positions of the moving part to an electric entity easily measurable can rely on any of a large number of known mechanisms.

According to one specific embodiment of the invention the sensor comprises a head arranged at the base of the hollow cone; the movable part, the hollow cone, and the head are electrically conductive; the hollow cone and the head are arranged spaced apart from each other; the hollow cone and the head are connected to the electric circuit; and the design is selected so that the movable part is in physical contact with the hollow cone in the first position and in physical contact with the hollow cone and the head in the second position. Hereby, the electric circuit is closed when the moving part is in the second position and open when the moving part is in the first position.

Such embodiment is uncomplicated and easy to implement.

Further characteristics of the invention and advantages thereof, will be evident from the following detailed description of preferred embodiments of the present invention given hereinafter and the accompanying FIGS. 1-6, which are given by way of illustration only, and are thus not limitative of the present invention.

DETAILED DESCRIPTION OF EMBODIMENTS

Figure 1:
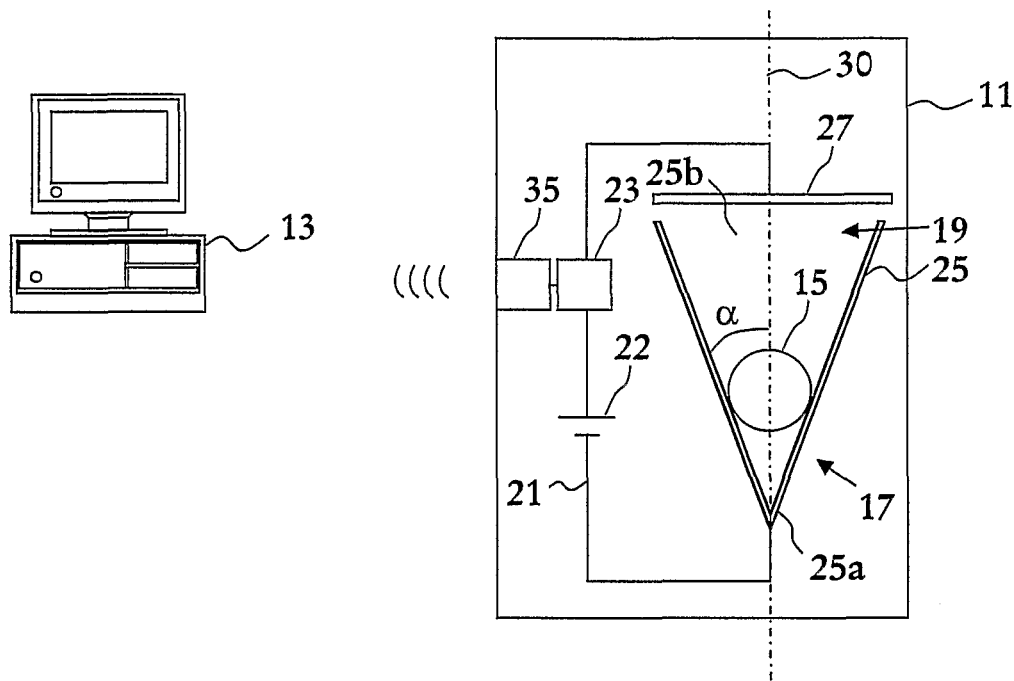
FIG. 1 illustrates schematically a detecting arrangement for dairy cattle according to an embodiment of the invention.

FIG. 1 illustrates a detecting arrangement for dairy cattle according to an embodiment of the invention.

The detecting arrangement comprises a sensor 11 provided for measuring lying and standing times for a milking animal, and a processing device 13 for post-processing the measurement data.

The sensor 11, which is attachable to the milking animal, preferably a leg thereof, comprises a hollow cone 25 oriented so that the tip 25a of the hollow cone 25 is pointing downwards when the sensor 11 is attached to the milking animal when she is standing. Thus, provided that the sensor 11 is attached to a part of the milking animal, which is turned about 90 degrees, when the milking animal lies down, the symmetry line 30 for the hollow cone 25 will be turned from essentially vertical to essentially horizontal. It has been established that when a cow lies down, she flips her legs from an essentially vertical to an essentially horizontal position, i.e. her leg flips about 90 degrees.

Figure 2:
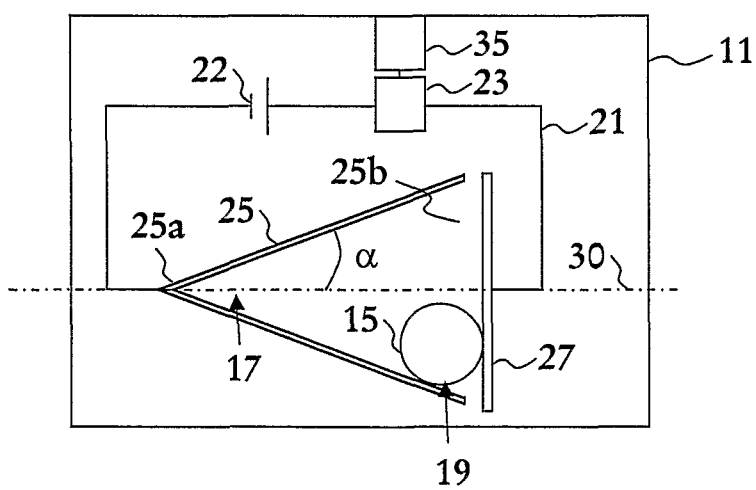
FIG. 2 illustrates schematically a sensor of the detecting arrangement of FIG. 1 in a lying position.

The sensor 11 in FIG. 1 is oriented in upright position with the symmetry line 30 being essentially vertical, whereas FIG. 2 illustrates the sensor 11 in a lying position with the symmetry line 30 being essentially horizontal.

A loose member or part 15, which preferably is a ball and in the following referred to as a ball, is arranged within the hollow cone 25, and a head or cover 27 is arranged at the base 25b of the hollow cone 25 to define an enclosure for the ball 15. The ball 15 is movable within the hollow cone 25 between a first position 17 and a second position 19 reached by means of the force of gravity acting on the ball 15. The first position 17 is located at the tip 25a of the hollow cone 25 and is reached when the milking animal is standing, see FIG. 1, and the second position 19 located at the base 25b of the hollow cone 25 is reached when the milking animal is lying, see FIG. 2.

The means for converting the movement by and/or the different positions of the moving ball 15 to an easily measurable entity may rely on any of a large number of known mechanisms. In the embodiment in FIGS. 1-2 the ball 15, the hollow cone 25, and the head 27 are electrically conductive. The hollow cone 25 and the head 27 are arranged with distance from each other close to the base 27b of the hollow cone 25. The hollow cone 25 and the head 27 are connected to an electric circuit 21 powered by a battery or other power source 22. As can be seen in FIGS. 1-2, the ball 15 is in physical contact with only the hollow cone 25 in the first position 17 and in physical contact with the hollow cone 25 and the head 27 in the second position 19. Hereby, the electric circuit 21 is open when the ball 15 is in the first position 17 and closed when the ball 15 is in the second position 19 to allow a current to flow in the electric circuit.

For this purpose the person skilled in the art realizes that the head 27 does not necessarily have to have the shape of a circular disc, but may have an arbitrary shape as long as the ball 15 is in physical contact with the hollow cone 25 and the head 27 in the second position 19. For instance, the head may have the shape of a ring.

Any known device, mechanism or means 23 for measuring when a current is flowing in the electric circuit 21 is provided, and thus lying and standing times for the milking animal are detected. A transmitter 35 is provided for wirelessly transmitting the detected lying and standing times for the milking animal to the processing device 13, which may in turn be connected to, or form an integral part of, a herd management system which controls various activities such as e.g. milking and feeding of the entire herd of dairy cattle.

The processing device 13 may be provided for automatically comparing the measured lying and standing times for the milking animal with reference values of lying and standing times, and for automatically indicating whether the measured lying and standing times deviate from the reference values. Further, the processing device 13 may comprise, or be connected to, a display unit for displaying measured lying and standing time data and/or deviation data.

Figure 3:
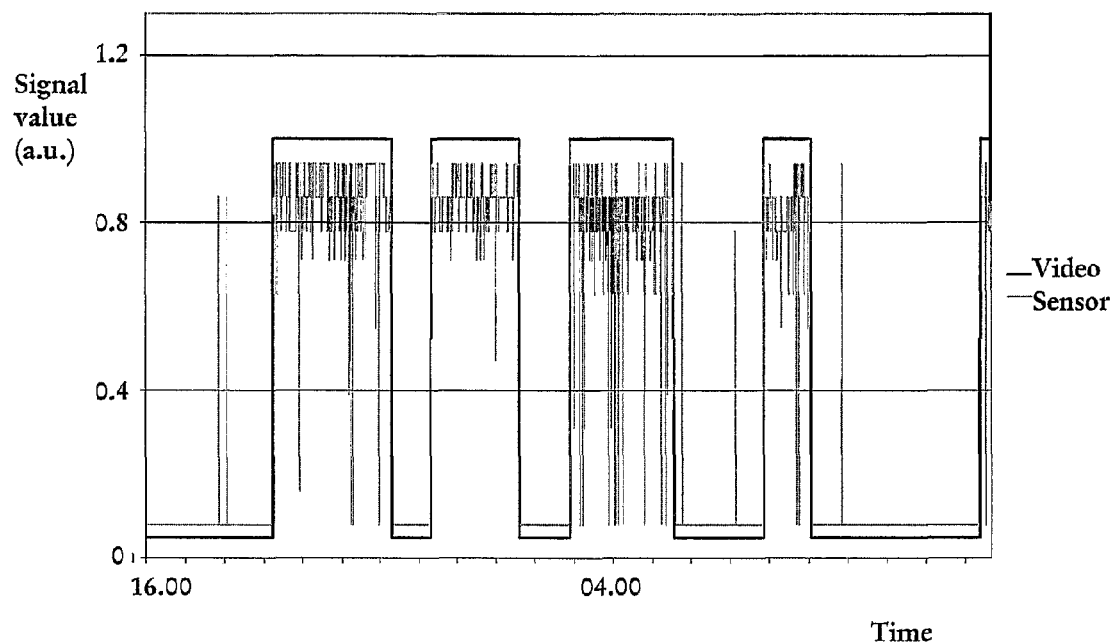
FIG. 3 is a diagram of lying and standing times for a tied cow as detected by the arrangement of FIG. 1 and as detected manually from video data for comparison.

FIG. 3 shows lying and standing times for a cow in a tied up barn as detected by the arrangement of FIG. 1 and as detected manually from videotape data for comparison. Signal value as a function of time is illustrated, where a low signal indicates that the cow is standing and a high signal indicates that the cow is lying. The hollow cone and the ball were of copper, the hollow cone had a diameter of 15 mm and an inclination angle $\alpha$ of 45 degrees, and the ball had a diameter of 5 mm.

Two registrations per minute were recorded. Unfiltered sensor values are shown and can be compared with values from the videotape data, which are considered to be true values. Only about 1.2% of the unfiltered sensor values were false, and most of these appeared when the cow was lying.

The number of false values can be reduced by vary the sampling time, use different data filters, and/or altering the cone angle of the hollow cone 25, and/or the size and/or density of the ball 15.

Figure 4:
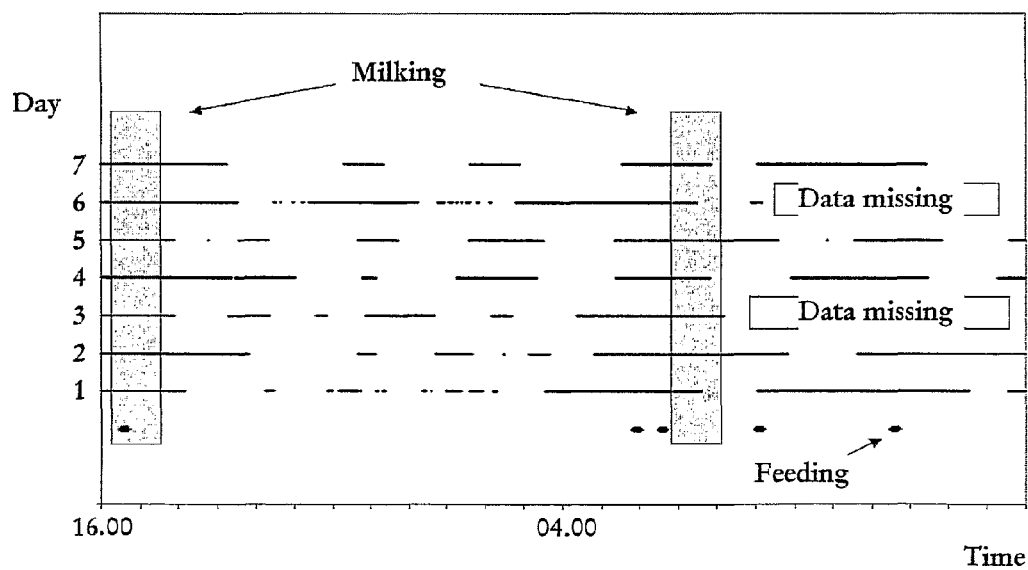
FIG. 4 is a diagram of lying and standing times for a tied cow during a week as detected by the arrangement of FIG. 1.
Figure 5:
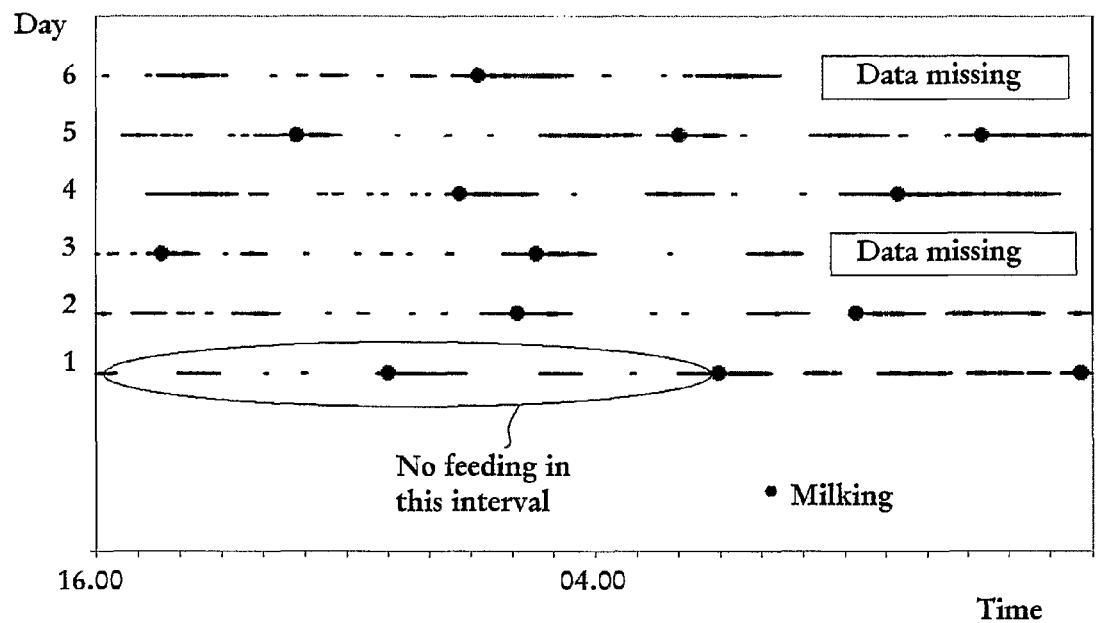
FIG. 5 is a diagram of lying and standing times for a cow in a voluntary milking system during a week as detected by the arrangement of FIG. 1.

FIGS. 4 and 5 illustrate lying and standing times for a tied cow and for a cow in a voluntary milking system, respectively, during a week as detected by the arrangement of FIG. 1. Solid lines indicate standing times and lacks of a solid line indicate lying times. Further, milking and feeding times are indicated.

In an alternative embodiment of the invention the sensor 11 comprises a coil instead of the head 27, the ball is magnetic and has at least one north pole and one south pole, and the hollow cone does not need to be of a conductive material. The magnetic ball is located in a region free of magnetic materials and induces an electrical voltage in the coil when moving between the first and second positions. This induced electric potential is measured and converted to lying and standing times for the milking animal. Detailed reference of the operation of such a detecting mechanism, but in an activity sensor, is given in U.S. Pat. No. 5,183,056, the contents of which being hereby incorporated by reference.

It shall be appreciated that the above hollow cone and ball based mechanism may used together with other moving ball-detecting means known in the art. For instance, the position of the ball may be sensed by a pressure sensor, an optical sensor, etc.

Further, the hollow cone may be exchanged for a bowl or the like oriented in an upright position when the sensor is attached to a standing milking animal and the ball is located at the bottom of the bowl in the first position and at the upper side of the bowl in the second position.

Generally speaking, an electric circuit is provided, which is influenceable by the ball; means are provided for measuring the influence of the electric circuit by the ball; and means are provided for obtaining lying and standing times for the milking animal based on the measured influence of the electric circuit.

By means of the detecting arrangement of the present invention it is possible to get a clearer view of how the cow spends her time. The detecting arrangement is capable of measuring standing and lying times for dairy cattle, which a common activity sensor fails to do.

The detecting arrangement based on the hollow cone and ball based mechanism is accurate, reliable, and uncomplicated. Since the cone is cylinder symmetric the sensor can be attached to any side of a leg of the animal as long as the tip of the cone points downwards, without hazarding the operation of the sensor. Similarly, the operation is not affected if the sensor moves around the leg. The ball will move to the base of the cone when the sensor is turned to a horizontal position caused by the animal when she lies down independently of in which direction she puts her legs.

According to another aspect of the invention the above arrangement, or any other arrangement such as e.g. an inclination sensor based arrangement with its sensor attached to a leg of the milking animal, for measuring lying and standing times for a milking animal is used for detecting estrous dairy cattle e.g. in tie-stall environments wherein each of the milking animals is continuously tied up in a stall. The detecting method comprises the steps of automatically measuring, by a sensor, lying and standing times for a milking animal; automatically comparing the measured lying and standing times for the milking animal with reference values of lying and standing times; and automatically establishing whether the milking animal is in heat or not based on the comparison.

The measured lying and standing times are preferably wirelessly transmitted to a processing device 13, such as the processing device 13 of the arrangement of FIG. 1, which performs the steps of automatically comparing and automatically establishing.

It has been verified that tied animals that are estrous are typically standing more frequently, and are shifting from standing to lying and vice versa more frequently. Thus, it is preferably automatically established that the milking animal is in heat if the sum of the measured standing times during a given time period exceeds a standing time reference value and/or if the number of measured standing times during a given time period exceeds a reference number value. The reference values of lying and standing times are typically determined from historical lying and standing time data for the particular milking animal or for a group of milking animals that may or may not include the particular milking animal.

By such technique it can be detected when the milking animal starts to deviate from her normal behavior. The given time periods may range from e.g. a few hours (a minimum time period is needed for distinguishing abnormal behavior) to several hours or even days (to minimize false estrus indications). The estrus period of a cow has been found in general to be 12-16 hours, but may vary between 2 and 30 hours.

Since milking animals such as cows are individuals with their individual behavior, the estrus detection technique of the present invention may not be suitable, or even possible to use, for each single individual. While the above solution in general is an appropriate estrus indicator for milking animals, it may nevertheless be combined with other sensors for indicating estrus to obtain a system capable of indicating estrus with high certainty. These other sensors include e.g. activity sensors and sensors for measuring contents of various species in milk produced by the milking animals. For instance, progesterone or other hormones in the milk may indicate that the milking animal is estrous.

According to yet another aspect of the invention the above detecting arrangement, or any other arrangement, for measuring lying and standing times for a milking animal is used for detecting a health condition of dairy cattle in loose house, free stall, tie-stall and/or robot milking environments. The detecting method comprises the steps of automatically measuring by a sensor lying and standing times for a milking animal; automatically comparing the measured lying and standing times for the milking animal with reference values of lying and standing times; and automatically indicating a health condition of the milking animal based on the comparison.

Preferably, it is automatically established that the milking animal is ill if the sum of the measured standing times during a given time period is below a standing time reference value and/or if the number of measured standing times during a given time period is below a reference number value.

The lengths of the given time periods may be as in previous embodiment. However, an ill milking animal would typically be ill until she is cured. It may be interesting to identify first and second given time periods as well as first and second standing time reference values and/or first and second reference number values. Then, it can be automatically established that the milking animal is ill if the sum of the measured standing times during the first given time period is below the first standing time reference value and/or if the number of measured standing times during the first given time period is below the first reference number value, and if no illness of the animal is established at this point, it can be automatically established that the milking animal is ill if the sum of the measured standing times during the second given time period is below the second standing time reference value and/or if the number of measured standing times during the second given time period is below the second reference number value, wherein the first given time period is shorter than the second given time period, the first standing time reference value is larger than the second standing time reference value, and the first number of measured standing times is larger than the second number of measured standing times.

Thus, it can be established after the shorter first given time period has lapsed that the milking animal is ill if her behavior differs very much from her normal behavior. If not, no establishment is made, and it can be established after the longer second given time period has lapsed that the milking animal is ill if her behavior differs from her normal behavior. Very ill animals are found very quickly, whereas less ill animals are found less quickly. The number of false ill establishments can in this manner be reduced.

This two-stage establishment may also be adjusted and applied to any the previously disclosed embodiments of the present invention.

It has been verified that animals that are ill are actually standing less frequently, and are shifting from standing to lying and vice versa less frequently.

Figure 6:
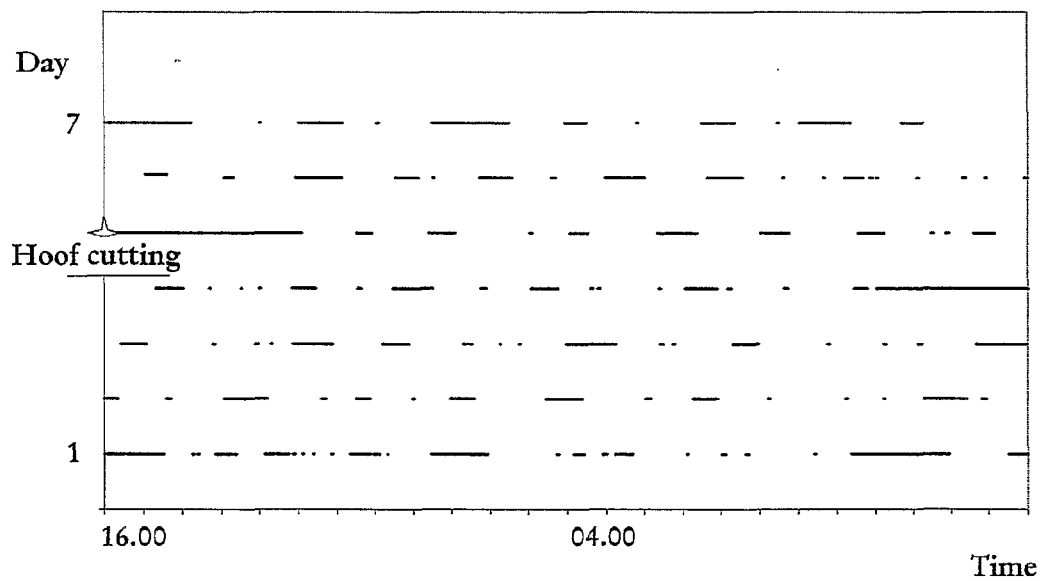
FIG. 6 is a diagram of lying and standing times for a cow in a voluntary milking system before and after hoof cutting as detected by the arrangement of FIG. 1.

In FIG. 6 lying and standing times for a cow having hoof problems before and after hoof cutting are shown. Solid lines indicate standing times and lacks of a solid line indicate lying times. Hoof cutting was performed after four days of measurement. It can be seen that the cow was standing more frequently, and shifted from lying to standing and vice versa more frequently a while after her hoofs were cut.

The invention claimed is:

1. A detecting method for dairy cattle, comprising:
automatically measuring, by a sensor, lying and standing times for a milking animal;
automatically comparing the measured lying and standing times for said milking animal with reference values of lying and standing times, using i) a part movable between a first position and a second position, said first position being reached when said milking animal is standing and said second position being reached when said milking animal is lying, ii) an electric circuit influenceable by said movable part, iii) means for measuring the influence of said electric circuit by said movable part; and i) means for detecting lying and standing times for said milking animal based on said measured influence of said electric circuit; and
automatically establishing whether said milking animal is in heat or not based on said comparison.

2. The method of claim 1 wherein it is automatically established that said milking animal is ill if the sum of the measured standing times during a given time period is below a standing time reference value and/or if the number of measured standing times during a given time period is below a reference number value.

3. A detecting arrangement for dairy cattle, comprising:
a sensor provided for measuring lying and standing times for a milking animal, wherein said sensor is attachable to said milking animal and comprises:
a part movable between a first position and a second position, said first position being reached when said milking animal is standing and said second position being reached when said milking animal is lying;
an electric circuit influenceable by said movable part;
means for measuring the influence of said electric circuit by said movable part;
means for detecting lying and standing times for said milking animal based on said measured influence of said electric circuit; and
means automatically comparing the measured lying and standing times for said milking animal with reference values of lying and standing times, using i) the part movable between a first position and a second position, ii) the electric circuit influenceable by said movable part, iii) the means for measuring the influence of said electric circuit by said movable part; and v) the means for detecting lying and standing times for said milking animal based on said measured influence of said electric circuit, and automatically establishing whether said milking animal is in heat or not based on said comparison.

4. The arrangement of claim 3 wherein
said sensor comprises a hollow cone oriented so that the tip of the hollow cone is pointing downwards when said sensor is attached to said milking animal when said milking animal is standing;
said movable part is arranged within said hollow cone; said first and second positions are reached by means of the force of gravity acting on said movable part; and
said movable part is located at the tip of said hollow cone in said first position and at the base of said hollow cone in said second position.

5. The arrangement of claim 4 wherein said movable part is a ball.

6. The arrangement of claim 4, wherein
said sensor comprises a head arranged at the base of said hollow cone;
said movable part, said hollow cone, and said head are electrically conductive;
said hollow cone and said head are arranged spaced apart from each other;
said hollow cone and said head are connected to said electric circuit; and
said movable part is in physical contact with said hollow cone in said first position and in physical contact with said hollow cone and said head in said second position to thereby close said electric circuit when moving into said second position and open said electric circuit when moving into said first position.

7. The arrangement of claim 4 wherein
said electric circuit comprises a coil;
said movable part is magnetic and has at least one north pole and one south pole;
said movable part is located in a region free of magnetic materials; and
said movable part induces an electrical voltage in said coil when moving between said first and second positions.

8. The arrangement of claim 3, further comprising a transmitter for wirelessly transmitting the detected lying and standing times for said milking animal, and
wherein the means automatically comparing comprises a processor configured to automatically compare the lying and standing times for said milking animal with the reference values of lying and standing times, and for establishing whether said milking animal is in heat or not based on said comparison, wherein said processor is configured to for automatically establish that said milking animal is in heat if the sum of the measured standing times during a given time period is below a standing time reference value and/or if the number of measured standing times during a given time period is below a reference number value.

\* \* \* \* \*

UNITED STATES PATENT AND TRADEMARK OFFICE
CERTIFICATE OF CORRECTION

PATENT NO. : 8,662,021 B2  Page 1 of 1
APPLICATION NO. : 11/918941
DATED : March 4, 2014
INVENTOR(S) : Mats Gustafsson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1858 days.

Signed and Sealed this

Twenty-ninth Day of September, 2015

Michelle K. Lee
*Director of the United States Patent and Trademark Office*